INVENTORS
ARNOLD SCHONFELD
JOHN C. SCHULTE

BY Griffin and Stokes
ATTORNEYS

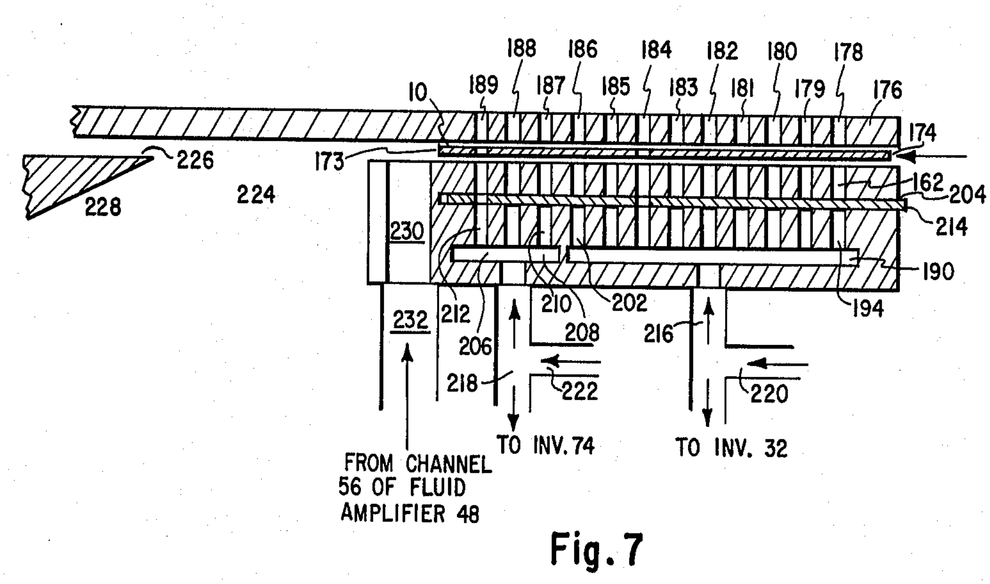
Fig. 7
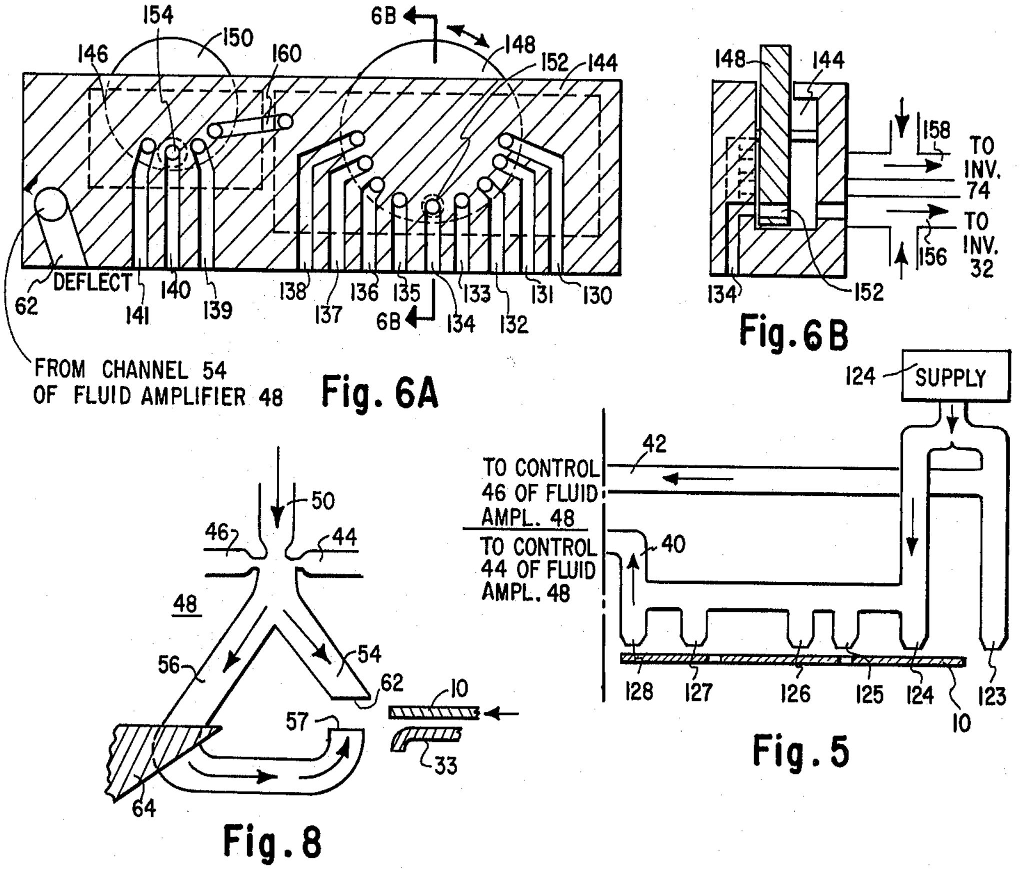
Fig. 6A Fig. 6B Fig. 5
Fig. 8

United States Patent Office 3,241,668

Patented Mar. 22, 1966

3,241,668

FLUID IDENTIFICATION AND SORTING DEVICE

Arnold Schonfeld, Levittown, and John C. Schulte, Maple Glen, Pa., assignors to Sperry Rand Corporation, New York, N.Y., a corporation of Delaware Filed Oct. 4, 1963, Ser. No. 313,875
38 Claims. (Cl. 209—110)

The present invention relates to fluid logic means for identifying particular information on moving sheet material, and more particularly, to fluid card sorting apparatus incorporating fluid identification and sorting logic.

The application of fluid techniques results in the elimination of most, if not all, moving and electrical parts for hole sensing and decoding of punched sheet material, such as record cards. Also, it eliminates moving parts and electrical devices for the diverting of cards to a designated stacking hopper. Devices constructed according to the principles of the present invention will therefore result in code savings during both manufacture and maintenance. In general, the principles disclosed herein can be applied to devices such as card readers, card punchers, card sorters, card verifiers, and other devices for analyzing punched tape as well. However, for purposes of illustration the present invention is disclosed herein in the environment of a fluid sorter in which it has novel application.

Therefore, one object of the present invention is to provide fluid means for identifying particular codes on punched sheet material in a manner to eliminate the problem of timing through use of edge detecting openings.

An additional object of the present invention is to utilize part of the fluid identification logic as card deflecting means at a sort station.

Another object of the invention is to provide a fluid sorter having the ability to selectively identify and/or sort on any code that may be devised.

A further object of the present invention is to provide a fluid device which can identify a multiple hole combination.

Another object of the present invention is to provide fluid means for sorting any character of any card column into any stacker, regardless of sorts made on preceding stacker stations or preceding columns.

Another object of the present invention is to provide fluid apparatus for "sorting by exception," i.e. all cards will be stacked except those having the desired code.

A further object of the present invention is to provide a fluid sorter for sorting on two or more columns of a card only when the proper code is contained in both columns, or when the proper code is contained in any of the columns.

These and other objects of the invention will become apparent in the following description to be read in view of the drawings, in which:

FIGURE 5 shows a slightly different embodiment of FIGURE 3 for identifying a multi-hole code;

FIGURES 6A–6B and 7 show alternative means for selectively changing the identification made by any of the embodiments of the present invention;

FIGURE 8 illustrates slightly alternative deflecting structure at the sort station;

Figures 1, 1C:
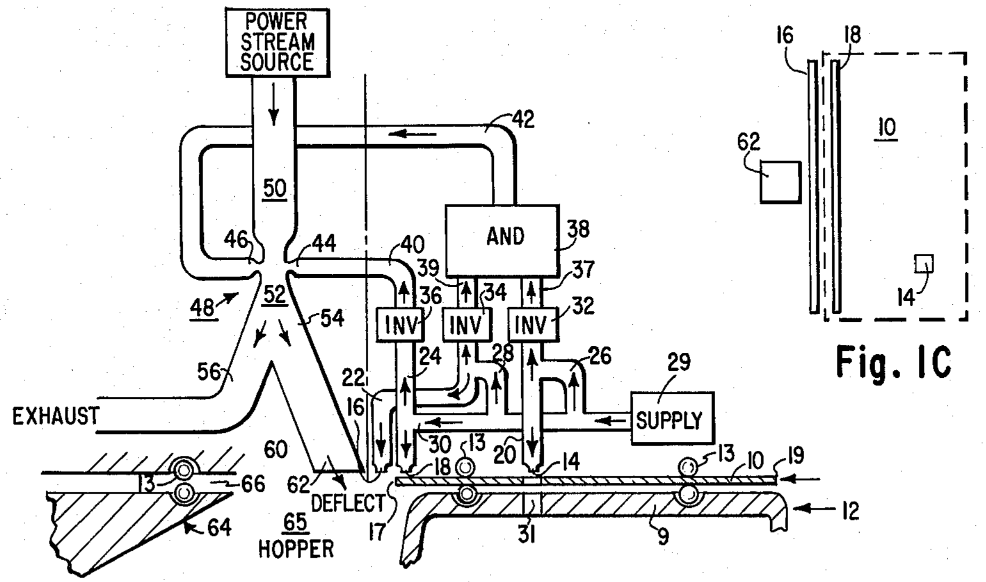
FIGURE 1 illustrates a first embodiment of the fluid identification logic.
FIGURES 1A, 1B and 1C show various locations for edge detecting openings.

FIGURE 1 illustrates in diagrammatic form one species of fluid logic used for determining if particular information is recorded on sheet material, such as a punched record card, so that said record card may thereafter be correctly processed. A plan view in dotted outline of a typical punched record card 10 is best shown in FIGURE 1A where it is seen to be comprised of a plurality of N column locations spaced lengthwise of the card, and M row locations spaced widthwise for designating numerical and/or zone index values within each column location. For a single hole code, only one perforation is found in each column at a particular row location therein so that the recorded information is usually confined to numerical values, i.e., a hole in only one of ten rows. Card 10 is normally introduced into a read station 12 such that the zone rows, if present, are scanned first followed by scanning of the numerical rows as the card traverses the station. Pairs of card feed rollers 13 may be provided to transport the card. A perforation sensing fluid opening 14 is located at the read station in such a position to scan only one selected column on the card which, for the purpose of explaining the operation of FIGURE 1, is here assumed to be column 3. Also included in read station 12 are two edge detecting fluid openings 16 and 18 which are side-by-side in the direction of card motion and are preferably located some place along the long edge of the card to avoid scanning any card column. One preferred location of openings 16 and 18 is that shown in the plan view of FIGURE 1A wherein it is seen that they scan the unperforated card area between column N and a short edge of the card. An alternative location of these openings is between adjacent card columns one of which may be scanned by opening 14 in the manner shown in FIGURE 1B. On the other hand, each edge detecting opening 16 and 18 can be in the nature of an extremely thin slot extending for most, if not all, of the card length as shown in FIGURE 1C. The width of each slot in the direction of card motion is such that it is effectively blocked by any row area of a card directly aligned therewith notwithstanding the fact that several of the card columns may have perforations in said aligned row. It would only be where most of the columns have a perforation in said aligned row, an extremely unlikely case, that an edge detecting opening would become effectively unblocked during the passage of a card therebeneath.

Opening 14 is spaced from opening 18, in the direction of card motion, for a distance determined by the particular card information whose presence is to be detected by the fluid logic. For example, to detect a perforation in a row M requires that opening 14 be aligned with respect to said row when the card leading edge 17 is positioned between openings 16 and 18. Connected to fluid openings 14, 16 and 18 are fluid channels 20, 22 and 24, respectively, each of which in turn is continuously fed from a pressurized fluid supply 29 via conduits 26, 28 and 30. By use of suitable restrictions in these conduits, or in any other manner, either a lower or a higher value of fluid pressure can be made to exist in each channel 20, 22 and 24 according to whether its respective fluid opening at the read station is unblocked or blocked by card material, respectively. The terms "lower" and "higher" as used herein are relative to each other and also to the pressure of the fluid from supply 29. If the fluid utilized is air and the environment of card 10 is the atmosphere, then for a positive constant supply pressure greater than atmospheric the term "higher" refers to a value more positive than a "lower" value. On the other hand, for a negative constant supply pressure less than atmospheric, "higher" refers to a value more negative than a "lower" value. In the case of opening 14, the alignment of a card perforation therewith allows fluid to escape from channel 20 through the card and an aperture 31 in a backup plate 33. This prevents buildup of pressure to a higher value in channel 20 which is otherwise the case whenever opening 14 is blocked by an unperforated area of the column being scanned. Channels 22 and 24 likewise hold fluid at a relatively higher pressure whenever their respective read station openings 16 and 18 are blocked by aligned card material. Each channel 20, 22 and 24 further has a respective fluid pressure inversion means 32, 34 and 36 located on the opposite side of the respective supply conduit from the opening and whose function is to produce a higher fluid pressure output in response to a lower fluid pressure input, and vice versa. The outputs of inverters 32 and 34 are directed to the inputs 37 and 39, respectively, of a fluid pressure logical AND means 38 whose function is to produce a higher fluid pressure output in response to the concurrent application thereto of higher fluid pressures from the inverters 32 and 34. On the other hand, if one or both of the input signals to AND 38 is of a lower pressure, then its output is also a lower pressure.

Outputs from inverter 36 and AND 38 are directed via respective fluid channels 40 and 42 to respective opposed control input channels 44 and 46 of a pure fluid amplifier generally indicated by 48. Pure fluid amplifier 48 is comprised of a fluid power stream input channel 50 which terminates at one end wall of an interaction chamber 52 into which also feed control channels 44 and 46. Two power stream output channels 54 and 56 branch from the opposite end wall of chamber 52. Since pure fluid amplifiers are well known in the art, only a brief explanation will here be given of the theory involved in the operation of amplifier 48. Relatively high energy power fluid is supplied to channel 50 and issues into chamber 52 as a jet. By creating a transverse pressure differential across the jet within chamber 52, the power stream may be deflected to exit therefrom via either one of the output channels 54 or 56. Such a pressure differential is usually created by selectively issuing a control stream from one of the input channels 44 or 46 into chamber 52 where it impinges upon the power stream. Conversely, some fluid amplifiers operate by creating a vacuum pressure on one side of the power stream at the control input. In FIGURE 1, amplifier 48 is designed so that power stream flow in either output channel 54 or 56 is table after it has once been deflected thereto by a temporarily applied control signal. Although this stable characteristic may be provided in a number of ways, a preferred technique is by use of the well known boundary layer lock-on effect. Thus, if a control fluid stream from input 46 temporarily impinges upon the power stream, said power stream is deflected to pass through output channel 54 whereby fluid particles between the power stream and the outer wall of channel 54 are entrained by the power stream which thus creates a pressure differential tending to maintain power stream flow in channel 54 even after the control stream is terminated. The boundary layer lock-on effect is also present in output channel 56. When power stream flow has once been established in either output channel, it can only be deflected to the opposite output channel upon the initiation of the proper control stream. Thus, if the power stream is locked in output channel 54, it can only be deflected to output channel 56 when a control stream issues from channel 44.

Amplifier 48 has a dual purpose in the embodiment of FIGURE 1. First, it is part of the fluid logic for determining if a perforation is contained in a specified row position of the card column being scanned. When power stream flow is switched to output channel 54, this is an indication that said particular information is held by the card. Second, amplifier 48 also constitutes the card deflecting means at a sort station 60 which physically is adjacent read station 12 for receiving card 10 subsequent to its passage through the latter. Power stream output channel 54 terminates in a fluid opening 62 at a point adjacent the path taken by the card as it first enters sort station 60. Opening 62 may be of any desired size or shape. Directly opposite opening 62 is the entrance 64 to a stacking hopper 65 which receives all cards containing the particular information for which detection is possible at read station 12. On the other hand, if card 10 does not contain said particular information, it takes a second path 66 which leads to another hopper, another read station, or some other processing means. As card 10 moves in the direction indicated by the arrow, it passes beneath opening 62 and has its leading edge deflected into path 64 if there is power stream fluid from output channel 54 at this time. On the other hand, absence of power stream flow in output channel 54 permits card 10 to continue in a direction which takes its leading edge into channel 66.

Figure 1D:
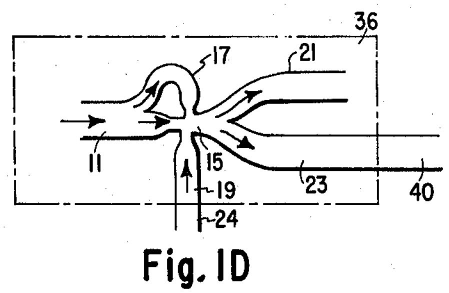
FIGURES 1D, 1E and 1F show various forms of fluid logical elements.
Figure 1F:
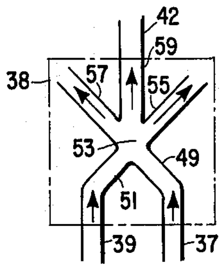

FIGURE 1D shows one version of a fluid amplifier inverter which can be used for elements 32, 34 and 36 in FIGURE 1. A power stream input channel 11, to which is supplied fluid from some source such as supply 29, terminates at an interaction chamber 15 from which exits two power stream output channels 21 and 23. Power stream output channel 23 becomes output 40 of, for example, inverter 36 of FIGURE 1. Branching off from power stream output channel 11 is a biasing control stream channel 17 which directs part of the power stream input fluid into the interaction chamber 15 in a direction substantially at a right angle to the main body of power stream flow through said chamber. Another control stream input channel 19 enters chamber 15 on the opposite side thereof from channel 17, with channel 19 receiving fluid from channel 24 of FIGURE 1. Assuming that power stream fluid is continuously applied to channel 11, there is always control stream fluid in channel 17. The magnitude of control stream fluid in channel 19 depends upon the pressure existing in channel 24. For example, when openaing 18 is unblocked, little or no control stream fluid flows through channel 19 to interaction chamber 15. With opening 18 blocked by card 10, however, there will be a substantial flow of fluid in control stream channel 19. The control stream channels 17 and 19 are so designed that when there is absence of control stream flow in channel 19, the energy of the continuously flowing control stream in channel 17 is sufficient to cause the power stream to exit from chamber 15 via channel 23 and thus into channel 40. On the other hand, when there is control stream flow in channel 19 due to the blockage of opening 18, this channel 19 control stream overrides the channel 17 control stream so as to force the power stream to exit from chamber 15 via channel 21. Channel 21 in turn exhausts to supply 29 or some similar supply. Consequently, it is seen that power stream flow exists in channel 23 only when there is no control stream flow in channel 19, whereas power stream flow is absent from channel 23 during the presence of flow in channel 19. An inversion of the fluid input signal takes place with result that a higher pressure output signal is generated in response to a lower pressure input signal, and vice versa.

Figure 1E:
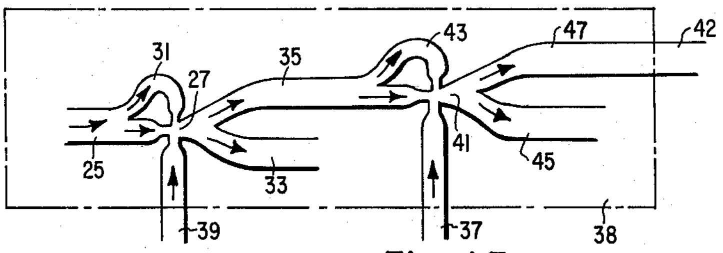
Figure 1A:
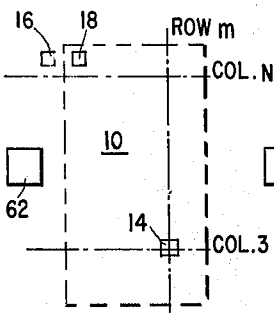
Figure 1B:
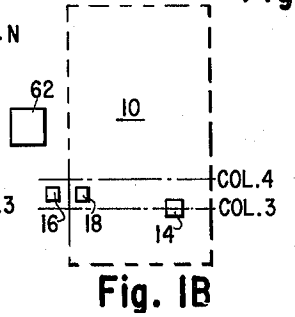

FIGURE 1E illustrates how two of the inverters of FIGURE 1D may be connected in tandem to form AND structure which can be used for element 38 in FIGURE 1. The first inverter subcombination in FIGURE 1E is comprised of a power stream input channel 25 continuously receiving power stream fluid, and two power stream output channels 33 and 35 through which said power stream may selectively flow. A control stream channel 31 is branched from power stream channel 25 to provide the biasing effect for forcing power stream flow to channel 33 in the absence of an input signal to this inverter. Said input signal in turn is supplied from channel 39 in FIGURE 1 to the opposed control stream channel of the inverter. It is only when there is sufficient pressure in channel 39, due to a higher pressure output from inverter 34 of FIGURE 1, that there is power stream flow in output channel 35. Said channel 35 flow in turn enters a second fluid interaction chamber 41 of the second inverter subcombination. Two channels 45 and 47 branch from said chamber 41, with chamber 47 becoming channel 42 in FIGURE 1. However, due to the presence of a control biasing channel 43, there will be no power stream flow in channel 47 unless an input fluid stream is also applied to channel 37 which in turn is connected to the opposed control channel of the output inverter subcombination. From the above, it will therefore be appreciated that fluid streams must be concurrently applied to both inputs of the AND structure in order to obtain power stream flow in channel 47 (and hence channel 42). If either one of the control stream inputs is missing, then there will be power stream flow in either channels 33 or channel 45, but not in channel 47.

An alternative embodiment of the AND element is shown in FIGURE 1F. Input channels 37 and 39 of FIGURE 1 are respectively connected to channels 49 and 51 which in turn intersect at chamber 53. Branching from chamber 53 are two output exhaust channels 55 and 57 which are respectively opposite input channels 51 and 49. A third output channel 59 is connected between channels 55 and 57 in the manner shown. In operation, a fluid stream applied to only one of the input channels 49 or 51 passes through interaction chamber 53 without being deflected so as to exit therefrom via a respective one of the channels 55 or 57. It is only when input streams are concurrently applied to channels 49 and 51 that a fluid output appears in channel 59, and hence channel 42, due to the deflection of the input fluid streams as they enter chamber 53.

The operation of FIGURE 1 will now be described in connection with determining whether a hole exists in column 3, row 2 of the record card 10. Assume that card 10. Assume that card 10 is passed through read station 12 to sort station 60. Further assume that prior to card entry into read station 10, there is no other card already there so that all fluid openings 14, 16 and 18 are unblocked. The fluid pressures in channels 20, 22 and 24 are thus low and consequently, each inverter 32, 34 and 36 produces a relatively high pressure output. The high pressure signal from inverter 36 is applied to control input channel 44 of amplifier 48 to thereby cause the generation of a fluid control stream therefrom which impinges upon the power stream in chamber 52. At the same time, AND 38 also concurrently receives high pressure signals from inverters 32 and 34 to produce a relatively high output pressure which is communicated to control channel 46 of amplifier 48. This in turn also generates a control stream. Since control streams now issue simultaneously from the opposed control inputs, the power stream flow direction depends upon the degree of physical asymmetry present in the amplifier. The actual path taken by the power stream at this time is not crucial inasmuch as there is no card in sort station 60. As soon as opening 14 is blocked by the leading edge of card 10, however, then the channel 46 control stream terminates and the remaining control channel 44 stream now deflects the power stream into channel 56.

As record card 10 enters and moves through read station 12, its leading edge 17 eventually passes opening 18 which thereafter is blocked until trailing edge 19 moves to the left of said opening. Card 10 in FIGURE 1 is shown as blocking opening 18 but unblocking opening 16. Since it is now assumed that card 10 contains the desired information, i.e., a hole in row 2, opening 14 is also unblocked. The pressure in channel 24 is therefore relatively high which in turn causes inverter 36 to now produce a relatively low pressure output. Therefore, there is no longer any significant control stream issuing from channel 44 into chamber 52 of fluid amplifier 48. At the same time, however, AND 38 produces a relatively high pressure output since both openings 16 and 14 are unblocked. A control stream issues from control input 46 which deflects the power stream into output channel 54 whereupon it creates a boundary layer sufficient to maintain its flow in this channel until such time as a control signal is once again applied to input 44 of the amplifier. As card 10 moves to the left from its position in FIGURE 1, the blocking of opening 16 now decreases the output signal from AND 38 which in turn terminates the control 46 signal without, however, destroying the power stream flow in channel 54. As the leading edge 17 of card 10 passes beneath fluid opening 62 of sort station 60, the power stream of amplifier 48 impinges thereon and deflects the card into hopper 65 beneath. As the trailing edge of card 10 now moves to the left of opening 18, the pressure in channel 24 is reduced which in turn produces a control stream from channel 44 for thereafter deflecting the amplifier power stream back into channel 56. Thus, if a second record card immediately follows record card 10, the power stream will not deflect said record card into hopper 65 unless said record card also contains the row 2 hole. The distance required between adjacent cards is minimized to a value about the size of opening 18, or considered another way, a value which insures that the trailing edge 19 of card 10 no longer blocks opening 16 at the time when the leading edge of said record card blocks opening 18. It will thus be appreciated that the provision of edge detecting openings generally eliminates any problem in timing. Therefore, the card speed through the read station can vary without preventing the identification of information thereon.

Assume now that a record card passes through read station 12 which has information other than that to which station 10 responds. If a perforation should exist in a row other than row 2, it is impossible to block opening 18 concurrently with the unblocking of openings 14 and 16. Just prior when the card leading edge 17 passes opening 18, there is a control stream from channel 44. Opening 14 also is scanning row 1 which may or may not contain a perforation. Opening 16 is either unblocked or blocked according to the distance between successive cards. However, if opening 16 is unblocked, this means that opening 18 has been unblocked previously to the time now under discussion so that the power stream has been already reset to channel 56. If both openings 16 and 14 are unblocked, there is also a control stream from input 46. This control stream from 46, cannot deflect the power stream back into channel 54 because of the continued presence of the control 44 stream. The card continues to moves and reaches the position shown in FIGURE 1, i.e., opening 18 is blocked but opening 16 is unblocked. Both of the control streams at 44 and 46 are terminated, since opening 14 is also now opposite row 2 which does not contain a perforation. Consequently, the power stream continues to flow in output channel 56. As the card moves still further to the left so that opening 16 now also becomes blocked, AND 38 cannot produce a relatively high pressure output even though opening 14 now becomes unblocked by a perforation in the remaining rows. Consequently, there is no possibility of power stream flow in channel 54 during the time that the leading card edge traverses sort station 60.

Figures 1G, 2:
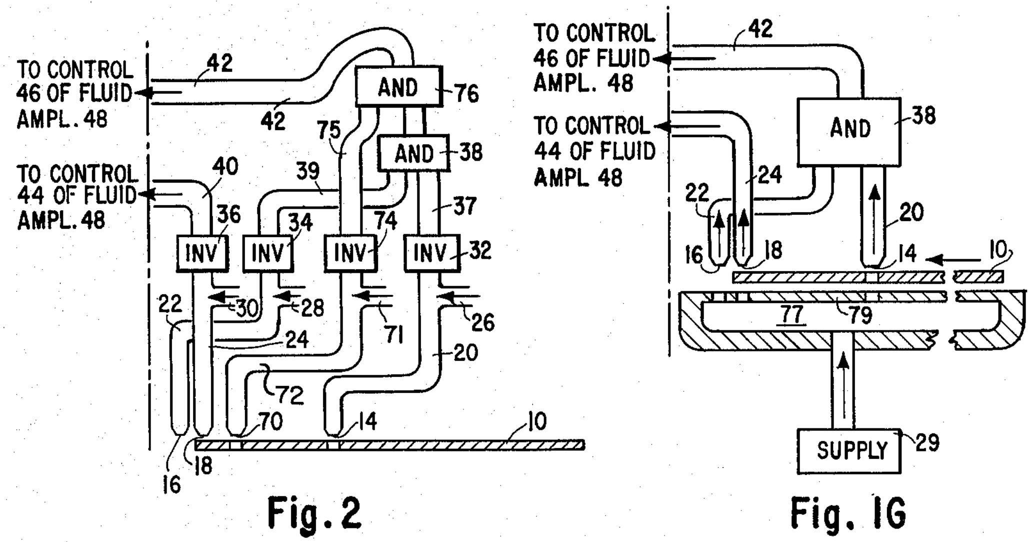
FIGURE 1G shows a slight modification which may be made to all embodiments of the invention.
FIGURE 2 shows a slightly different embodiment of FIGURE 1 for identifying a multi-hole code.

FIGURE 1G shows a slightly alternative embodiment of FIGURE 1 in which the inverters 32, 34 and 36 can be eliminated. A plenum chamber 77 is formed on the side of the card 10 opposite from openings 14, 16 and 18, with backing plate 79 having perforations therein which are directly opposite said openings. The supply 29 maintains fluid in the plenum 77 from which in turn flow streams through the backing plate perforations. These streams cross the card transport path and enter respective ones of the openings 14, 16 and 18 for conveyance through respective channels 20, 22 and 24. However, when card 10 is present, a fluid stream from plenum 77 enters its respective opening only when a card perforation aligned therewith. Fluid signals of higher pressure value are thus produced in both channels 22 and 20 only when the card contains information corresponding to the spacing of openings 14 and 16. These higher pressure values are communicated as inputs to AND 38 which in turn operates in identical manner to its operation in FIGURE 1. One disadvantage of FIGURE 1G, however, is that the air passing through the card path may get dirty and thus clog the logic circuits. This is no problem in FIGURE 1. Another advantage of FIGURE 1 lies in the fact that all fluid components can be placed on the same one side of the card including the supply sources and conduits.

FIGURE 2 shows a slight modification of the fluid logic in FIGURE 1 for enabling the detection of a particular two-hole code in the scanned card column. A two-hole code normally includes a row perforation in a row and one numerical row perforation for specifying either a number or a letter in an alphanumeric code. Equivalent elements in FIGURE 1 and FIGURE 2 are given corresponding numbers, and the details of the pure fluid amplifier 48 have been omitted in FIGURE 2 since they correspond to those of FIGURE 1. An additional perforation sensing opening 70 at read station 12 is located so as to be aligned with the specified zone row at the time when opening 18 is blocked and opening 16 is unblocked. A fluid channel 72 is connected with opening 70 and further includes an inverter 74 whose output 75 in turn is connected to one input of a second AND element 76, whose output is connected with channel 42. The other input to AND 76 is provided by the output of AND 38. The fluid pressure supply 29 is connected into the channel at a point between opening 70 and inverter 74 such that an unblocked state of opening 70 produces a relatively low fluid pressure, while a blocked condition produces a relatively high fluid pressure. It will therefore be seen that AND 76 produces a relatively high pressure output only when a particular predetermined two-hole combination is detected in the card.

Figure 3:
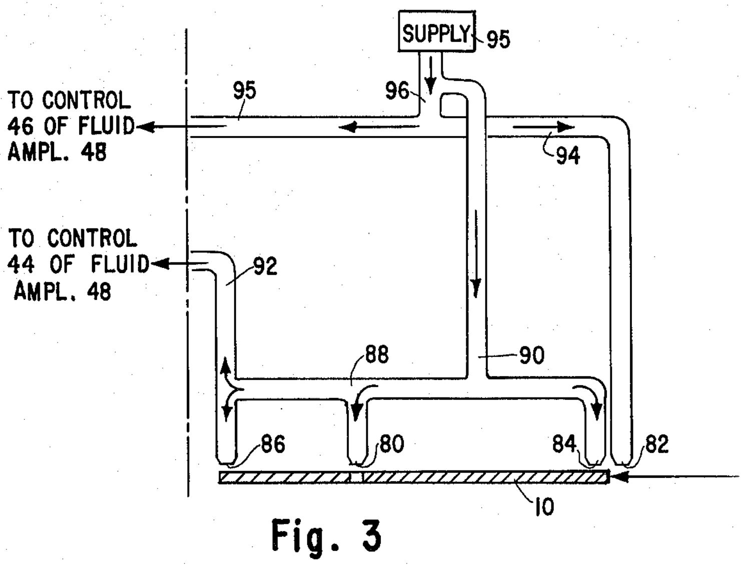
FIGURE 3 shows a second embodiment of the fluid identification logic.
Figure 4:
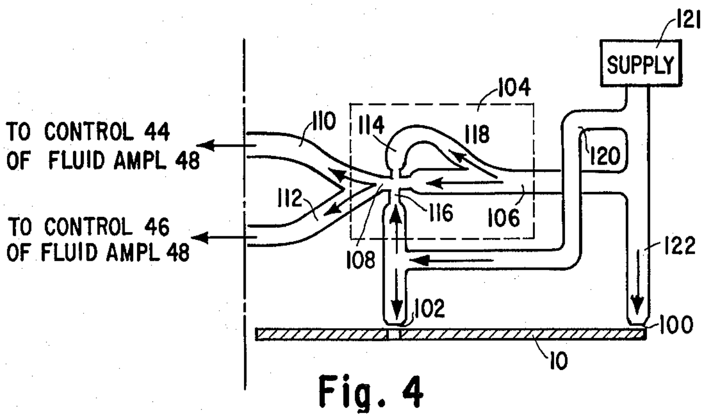
FIGURE 4 shows a third embodiment of the fluid identification logic.

FIGURES 3 and 4 are alternative embodiments of fluid logic designed to detect the presence of particular one-hole codes in a scanned card column. In each of these figures the fluid amplifier 48 of FIGURE 1 is utilized both as part of the logic and as the deflection means at sort station 60. In FIGURE 3, the perforation sensing opening 80 scans a selected card column, while edge detecting fluid openings 84 and 86 are located to avoid scanning a card column hole, unless said openings are as illustrated in FIGURE 1C. The distance between openings 86 and 84 is about equal to the card width such that there is only one card position which will concurrently block both. Opening 82 is also located to be blocked by card 10 and is to the rear of opening 84, but it need not be immediately behind the trailing edge of card 10 for the card position shown in FIGURE 3. This is so, because the purpose of opening 82 is to automatically place the fluid logic system into an initial operating condition as will be explained below. Opening 80 is located according to the particular column and row to be sampled. Openings 84, 80 and 86 are connected together by a branched channel 88 which in turn is continuously supplied from a source of fluid pressure 95 via input 90. Another conduit 92 is connected between channel 88 and the control input 44 of amplifier 48 in FIGURE 1. Fluid opening 82 has a channel 94 connected therewith which in turn is continuously supplied by the source of fluid pressure via an input 96. The other end of channel 94 is connected to control channel 46 of fluid amplifier 48. The function of opening 82 is to then initially set amplifier 48 to its deflect condition at the time when the card leading edge first passes thereunder.

The operation of FIGURE 3 is as follows. The unblocked condition of any one of the openings 80, 84 or 86 results in a reduced pressure in channel 92 so as to prevent a control stream at input 44 of the amplifier. In other words, all three of these openings must be blocked concurrently in order to create such a control stream. Opening 82 when blocked creates a control stream to input 46 of the amplifier. Assume now that all four fluid openings of the read station are unblocked. In this case, neither control stream of the amplifier 48 is actuated so that its power stream remains in that output channel to which it was last deflected. When the leading edge of the card enters the read station, opening 82 is blocked first and remains so until the card trailing edge passes to the left as illustrated in FIGURE 3. Consequently, from the time that the leading edge of the card passes beneath opening 82 to the time when the card trailing edge leaves said opening, a control stream appears at amplifier control input 46. This control stream sets amplifier 48 to its deflect condition. There is no control stream at amplifier control input 44 until the card leading edge passes beneath opening 86. The power stream therefore flows through output channel 54 at least until the card reaches the position shown in FIGURE 3. When the card moves to this position, opening 82 is now unblocked which thereupon terminates the control signal at input 46 without, however, automatically terminating power stream flow in channel 54. Openings 84 and 86 are now blocked, but if there is a hole in the row directly beneath opening 80 at this time, a relatively low pressure signal still exists in channels 88 and 92 which thereupon continues to prevent a control stream at input 44. Consequently, the power stream remains flowing through output channel 54. When the card moves to the left from its position in FIGURE 3, opening 84 becomes unblocked and thus continues the disabling of a control 44 input stream. The card enters the sort station and is deflected into the hopper. On the other hand, if there is no hole aligned with opening 80 for the FIGURE 3 card position, all three openings 80, 84 and 86 are blocked at the same time that opening 82 is unblocked. This creates a control stream at input 44 of the fluid amplifier. The power stream is now shifted into output channel 56 and remains there while the card leading edge passes through the sort station assuming that opening 82 remains unblocked. This assumption is true if the spacing between cards is sufficient. Thus it can be seen that there is no opposition of control signals within the fluid amplifier due to the fact that it is impossible to concurrently obtain relatively high pressures in channels 92 and 94. It should further be appreciated that although opening 82 is highly desirable for the automatic setting of amplifier 48 to deflect condition when a plurality of cards are being processed, other means could be employed to initially generate control fluid in control channel 46 prior to card 10 assuming the positions shown in FIGURE 3. For example, a manual setting might be performed by the operator for each card placed into the read station. Another feature of interest in FIGURE 3 is the fact that channel 88 acts as an AND logical element for providing a significant fluid output signal at 92 only when there is simultaneous blockage of the openings 86, 80 and 84 which in turn effectively act as inputs to said element. Recognition of this fact permits modification of FIGURE 3 in a number of ways without exercise of further invention.

FIGURE 4 illustrates still another embodiment of logic circuit which requires only one edge detecting fluid opening 100. A single perforation sensing fluid opening 102 is provided for scanning a selected card column. The distance between opening 100 and opening 102 is adjusted so that in the reading position shown in FIGURE 4, a predetermined row of the column is adjacent opening 102. FIGURE 4 also uses a second pure fluid amplifier, generally indicated at 104, in addition to the output fluid amplifier 46 used in the other circuits. Amplifier 104 is identical to the inverter element of FIGURE 1D and is comprised of a power stream input channel 106 which terminates in a chamber 108 from which branch two power stream output channels 110 and 112. Also entering chamber 108 are two control stream input channels 114 and 116. Control channel 114 in turn is connected to a branched conduit 118 which receives a portion of the power stream fluid in channel 106. Power stream channel 106 in turn is connected to channel 120 which is taken from channel 122. One end of channel 122 is connected to opening 100 and its other end is connected to the source of fluid supply. Control input channel 116 is connected with one end of a channel 124 whose other end is connected to opening 102, there being an intermediate connection via channel 126 with the source of fluid supply.

It will be readily observed that power stream fluid of significance is supplied to channel 106 only when opening 100 is blocked by the presence of card material therebeneath. Furthermore, when such power stream fluid is supplied, a small portion of it is diverted into channel 118 where it subsequently issues from control channel 114 into interaction chamber 108. In the absence of a control stream from channel 116, said control 114 stream diverts the power stream to flow into output channel 112 and from thence to control input 46 of the fluid amplifier 48. However, if a control stream issues from 116 concurrently with a control 114 stream, the former overrides the latter to force the power stream into output channel 110 from whence it is conducted to control input 44 of the fluid amplifier 48. The operation of FIGURE 4 is now seen to be clear. When the card enters the read station, opening 100 is blocked and power stream fluid is supplied to fluid amplifier 104 where it flows through output channel 112 except for those times when opening 102 is blocked by any unperforated part of the card column being scanned. In the card position illustrated in FIGURE 4, power stream fluid is still supplied to fluid amplifier 104 because opening 100 remains blocked. If a hole exists beneath opening 102, the pressure in channel 124 is reduced which in turn prevents a control stream at channel 116. Thus, power stream flow in output channel 112 switches the power stream of fluid amplifier 48 into output channel 54 where it remains stable until such time when a control stream from output 44 next appears. Any movement of the card to the left of its FIGURE 4 position blocks opening 102 but at the same time unblocks opening 100. Consequently, although a control stream now appears from channel 116, the absence of power stream fluid to amplifier 104 prevents a signal from being applied to control input channel 44 of amplifier 48 and the deflecting power stream remains in output channel 54. However, assume now that the card in FIGURE 4 does not contain a hole beneath opening 102 when in the position shown. Control streams from both channels 114 and 116 impinge upon the power stream fluid of amplifier 104, with the latter overriding the former such that said power stream exists by way of channel 110. The power stream of amplifier 48 is now deflected to output channel 56 just prior to the unblocking of opening 100 when the card moves further left. For this situation, then, the power stream of amplifier 48 flows through output channel 56 at the time when opening 100 first becomes unblocked. Even if opening 102 is subsequently unblocked by a hole in any succeeding row (which would terminate the control stream at input 116), there exists no power stream fluid for amplifier 104. Consequently, there can be no signal to control input 46 subsequent to the unblocking of opening 100. The card therefore remains undeflected as it passes through the sort station.

Another way of viewing the logical operation of FIGURE 4 is by considering the following Boolean algebra relationships. Let the presence of a fluid stream to channel 106 be represented by the symbol X, and the presence and absence of a fluid stream to channel 116 be respectively represented by Y and $\overline{Y}$ (where (⁻) represents the well known logical NOT function). Likewise, let the presence of fluid flow in channel 112 be represented by A, while the presence of fluid flow in channel 110 is represented by B. Using the symbol (·) to represent the logical AND function, the function of element 104 can now be expressed by the following Boolean equations:

$$A=X\cdot\overline{Y}$$
$$B=X\cdot Y$$

FIGURE 5 illustrates still another embodiment of the invention for reading two-hole codes in punched cards. The sensing fluid operates a fluid amplifier switch, such as switch 48 in FIGURE 1, which will either deflect the cards into hopper 65 or pass the cards to the next reading station. Card 10 first covers an opening 123 which causes signal fluid from supply 124 to pressurize signal line 42 on the deflect side of fluid amplifier 48, thus diverting air downward from opening 62 onto the card path. The function of opening 123, then, is to automatically place the fluid circuits in a particular initial operating condition prior to card entry. In this respect said opening plays a part identical to that performed by opening 82 in FIGURE 3. Thus, when the card reaches this deflect position it is forced down into hopper 65 unless, in the meantime, switch 48 is reset to exhaust via channel 56 in FIGURE 1. Edge detecting opening 124 and 128 are also provided, as are perforation sensing openings 125, 126 and 127. As the front edge of the card moves past sensing openings 124, 125, 126 and 127 (in this sequence), fluid still continues to be exhausted from opening 128 so as to maintain the pressure in signal line 40 at a lower value in order to prevent the reset of switch 48 to its exhaust side. Opening 123 is located a sufficient distance from the front edge sensing opening 128 such that when the latter is finally closed by the moving card, the former is unblocked to discontinue the higher pressure value to control channel 46. Whether or not channel 40, and hence control channel 44 of the fluid amplifier now receives a higher pressure (so as to place the fluid amplifier 48 in its exhaust condition) will now depend upon the spacing of perforation sensing openings 125, 126 and 127 with respect to the location of the two holes in card 10. The assumption is here made that these holes in the card represent information which can be identified by the reading station in FIGURE 5. It is thus seen that when front edge sensing opening 128 is initially closed by the card, the perforation sensing opening 125 is aligned with a perforation in a number row of the card so as to continue the maintenance of a lower pressure in channel 40. This prevents amplifier 48 from being returned to its exhaust condition. However, if there were no perforation in card 10 in the row location indicated in FIGURE 5, then all of the openings 125 through 128 would be blocked so as to raise the pressure value in channel 40 and thus force the power stream of amplifier 48 back into exhaust channel 56. For the position shown in FIGURE 5, opening 127 is to the left of the zone perforation a distance approximately equal to the diameter of said perforation, while opening 126 is to the left of the numerical perforation a distance approximately equal to twice the diameter of a perforation. Opening 124 is to the left of the trailing edge a distance approximately equal to three times the diameter of a perforation. When the card moves to the left one-hole width from its position in FIGURE 5, front edge sensing opening 128 continues to be blocked (it is actually blocked for the entire width of the card due to the fact that it is not affected by information holes therein) and opening 125 also now becomes blocked. The rear edge sensing opening 124 continues to remain blocked since it is still spaced from the trailing edge a distance approximately equal to twice the width of a hole. Number sensing opening 126 remains blocked because it is spaced from the other number sensing opening 125 by the width of one hole. However, since there is a zone perforation in the card, in the proper row, zone sensing opening 127 is now aligned therewith so as to continue the lower pressure in conduit 40. However, if there were no hole in the zone row now being scanned, all openings associated with conduit 40 would be blocked, and the pressure therein would be increased so as to reset fluid amplifier 48 to its exhaust condition. When card 10 again moves one hole width, the zone sensing opening 127 becomes blocked while the second number sensing opening 126 is unblocked by the number row hole, thereby allowing fluid to exhaust and so preventing a rise of pressure in channel 40. This second number opening 126 is necessary in order to prevent the false identification of those cards with hole spacing of the same pattern but in reverse order of the desired code. For example, without the second number row opening 126, it would be possible to accept a code which has a pattern that first opens the zone sensing opening 127 and then opens the number sensing opening 125, instead of the other way around as has been described above. However, by including opening 126, a reverse pattern of this nature fails to unblock opening 126 during this next step leftward of the card, whereupon all openings 124 through 128 would be blocked to increase the pressure in channel 40 and to reset the fluid amplifier 48.

Card 10 finally moves to uncover the rear edge sensing opening 124 at the precise time when all other openings 125 through 128 are still blocked. The uncovering of opening 124 also prevents resetting of amplifier 48 so that the card is now deflected into hopper 65. On the other hand, if the card holes are not in proper spacing, then there is at least one position of the card which will cause all openings 124 through 128 to be simultaneously blocked so as to reset fluid amplifier 48 to its exhaust condition prior to the time when card 10 passes across hopper 65. It can be seen that similar arrangements can be used for codes of more than two holes, or for holes in two or more column positions which allows for sorting on a variety of hole patterns on the face of the card.

It has been observed that the spacing of the hole sensing openings with respect to the edge detecting openings determines what particular character can be identified. In FIGURE 1, for example, opening 14 looks for a perforation in row 2 of the scanned column. A scan may be made for a different character by merely positioning opening 14 so that it examines a different row at the time when the edge detecting openings are properly blocked and/or unblocked. FIGURES 6 and 7 each shows novel structure for selectively varying the effective character sensing holes at the read station. Referring first to FIGURES 6A and 6B, the read station has as many character sensing fluid openings 130 through 141 as there are rows in the column being scanned. Those fluid openings 130 through 138, which are associated with numerical rows, are connected by respective channels to the left side wall of a plenum chamber 144 best shown in FIGURE 6B. The zone row fluid openings 139, 140 and 141 are connected by respective channels to the left side wall of a second plenum chamber 146. Partially extending within each plenum chamber 114 and 146 and adjacent the left side wall of each are respective rotatable discs 148 and 150 journalled in the side walls. Disc 148 carries a single port 152 near its periphery, while disc 150 carries a single port 154 near its periphery. Each port 152 and 154 provides communication from the left side wall of the respective chamber to the interior of the chamber. Thus, by turning the discs 148 and 146 as by the operator's thumb, any one of the card numerical hole sensing fluid openings 130–138 can be selectively placed in communication with plenum chamber 144, while any one of the card zone openings 139–141 can be selectively placed in communication with plenum chamber 146. Plenum chamber 144 in turn is connected to channel 156 identical in function with that of channel 20 in FIGURE 2. Plenum chamber 146 is connected to a channel 158 identical in function with that of channel 72 of FIGURE 2. Channels 156 and 158 are each continuously supplied with fluid so that when a hole appears beneath a selected fluid opening, the pressure in the plenum chamber is reduced. FIGURE 6A further shows a channel 160 extending between plenum chambers 144 and 146. One end of this channel continuously communicates with plenum chamber 144 without need for alignment with port 152, but its other end communicates with chamber 146 only when disc 150 is rotated to bring port 154 into alignment therewith. This particular positioning of disc 150 is made whenever only a one-hole code is to be processed, since by placing chamber 146 in constant communication with chamber 144 the reduction in pressure in the latter is automatically communicated to the former so that AND 38 (FIGURE 2) can be activated even though there never occurs a zone perforation.

FIGURE 7 is an alternative embodiment for permitting the read station to selectively identify any one of a variety of two-hole codes. In this configuration a plurality of perforation sensing fluid openings 162 through 173, inclusive, are situated beneath a record card 174 to be read. A back-up plate 176 with corresponding aligned holes 178 through 189, inclusive, is provided above the card. Also situated beneath record card 174 is a plenum chamber 190 which is covered by a grid 192 having a plurality of holes 194 through 202, inclusive, each of which is respectively aligned with one of the fluid openings 162 through 170, but separated therefrom by a small gap 204. A zone plenum chamber 206 is provided which is covered by a grid 208 having three holes 210, 211 and 212 which are respectively aligned with fluid openings 171, 172 and 173 but separated therefrom by the same small gap 204. By inserting a punched program code card 214 into gap 204, where said program code card has one perforation in the numerical row and one perforation in the zone row, any one of the numerical fluid openings 162–170 and any one of the zone openings 171–173 may be selected for communication with respective plenum chambers 190 and 206. Plenum chamber 190 in turn is connected via a channel 216 to an inverter, such as inverter 32 in FIGURE 2, while plenum chamber 206 is connected via a channel 218 to an inverter such as 74 in FIGURE 2. Each channel 216 and 218 is continuously supplied by fluid pressure entering at 220 and 222, respectively. As card 174 passes through the read station and into the sort station area 224, it either takes a path straight ahead into channel 226 or downward into channel 228 for stacking in the hopper associated with the read station. The particular path taken by card 174 is determined by the presence or absence of fluid pressure from a channel 230 which communicates via a channel 232 with an output channel of a fluid amplifier corresponding to output channel 56 of the amplifier 48 in FIGURE 1. It will be noted here that polarities of the fluid amplifier output channels are reversed in FIGURE 7 from those in FIGURE 1 since the sort fluid stream strikes record card 174 on the opposite face. However, the configuration of FIGURE 7 may obviously be placed above the record card if so desired.

FIGURE 8 illustrates how both channels of an output fluid amplifier may be used at the sort station for any of the species shown. For example, the output channel 56 of amplifier 48 in FIGURE 1 can be connected to a fluid opening 57 positioned beneath record card 10 so that the power stream is used to help maintain card 10 in an undeflected path as it passes over the entrance to hopper 65.

Figure 9A:
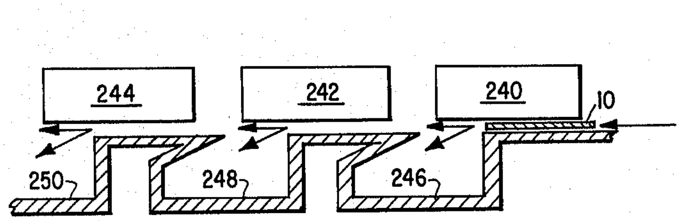
FIGURES 9A, 9B and 9C illustrate a multi-read station sorter employing the present invention.
Figure 9B:
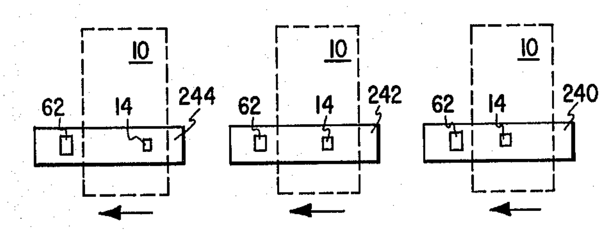
Figure 9C:
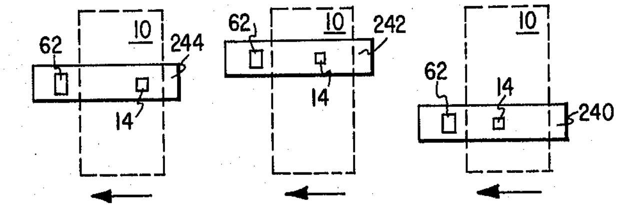

FIGURES 9A, 9B and 9C generally show how a plurality of read-sort stations may be arranged to successively operate upon a record card passing therethrough. In FIGURE 9A, blocks 240, 242, 244, etc., identify the column location of each read-sort station, while numbers 246, 248, 250, etc., identify the hoppers respectively associated with each. Each record card 10 is transported along a card path 11 beneath said read-sort stations 240, etc., with each station acting as a decision point. Any number of read-sort stations may be used along an indefinite card path length. Each may be designed to accept or reject cards with any variety of hole patterns regardless of the code identified by a preceding read-sort station. For example, FIGURES 9B and 9C are diagrammatic plan views of FIGURE 9A showing how each read-sort station may scan the same card column (FIGURE 9B) or may be adjusted to scan different card columns (FIGURE 9C). One purpose in using the FIGURE 9C technique might be the case where station 240 sorts for a number 2 in card column 3; station 242 sorts for a number 6 in card column 60; station 244 sorts for a number 5 in card column 43; etc.

Figure 10:
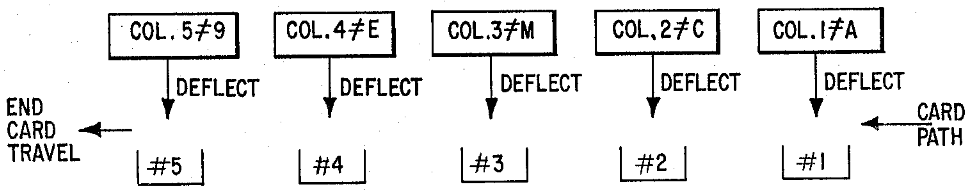
FIGURE 10 illustrates the method of "sorting by exception"
Figure 11:
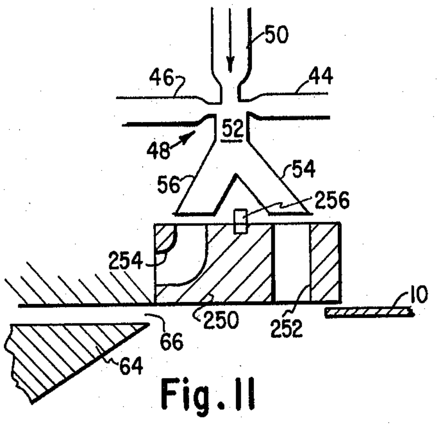
FIGURE 11 shows structure for "sorting by exception"

By providing means to selectively use either one of the fluid amplifier 48 output channels 54 or 56 in deflecting a record card, a system such as that shown in FIGURE 9A may be adapted for the technique of "sorting by exception" as schematically illustrated in FIGURE 10. In FIGURE 11, the deflecting fluid amplifier, such as 48 in FIGURE 1 or 2, feeds into a rotatable body 250 which in turn contains channels 252 and 254 either of which may be aligned with either channel 54 or 56. When channel 252 is aligned with output channel 54, channel 254 is aligned with output channel 56. For this position of body 250 card 10 is deflected into hopper 65 whenever said card contains the particular information for which the associated read station is meant to identify. On the other hand, when body 250 is rotated about axis 256 such that channel 254 becomes aligned with channel 54 while channel 252 becomes aligned with channel 56, it is seen that power stream flow through channel 56 is directed upon card 10 while power stream flow in channel 54 is exhausted without contact on said card. For this reversed position of body 250, card 10 is deflected into hopper 65 whenever the associated read station determines that said card does not carry the particular information for which identification is possible. Cards with the proper hole pattern are passed to the next station via path 66 due to the fact that power stream flow in output channel 54 exhausts through channel 254 without impinging upon the card. Instead of the structure shown in FIGURE 11, however, an alternative arrangement for "sorting by exception" might be to selectively interchange the connections of channels 42 and 40 with control channels 46 and 44 in FIGURE 1.

Returning now to FIGURE 10, assume that each of the read-sort stations 240, etc. in FIGURE 9A is adjusted to "sort by exception," i.e., to deflect a card into its respective hopper only when said card does *not* contain the code which the station is equipped to identify. As an example, let the first five stations be selectively adjusted to locate any card having the information ACME 9 in card columns 1 through 5. Station 1, which is first to receive a series of cards, is equipped to deflect into its hopper all cards which do *not* contain letter A in column 1. Read-sort station 2 deflects into its associated hopper all cards which do *not* contain the letter C in column 2. Read-sort station 3 deflects into its hopper all cards which do *not* contain the letter M in column 3, while read station 4 deflects into its associated hopper all cards which do *not* contain the numeral 9 in column 5. Consequently, it can be seen that all cards reaching the end of the card path beyond station 5 are those with the selected word ACME 9, since cards having other information are deflected into at least one of the previous hoppers.

Figure 12:
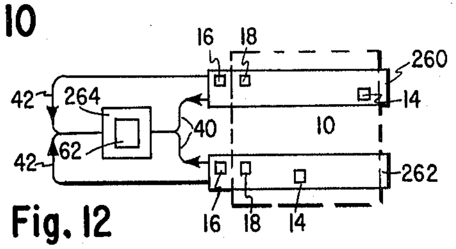
FIGURES 12 and 13 show different techniques for multiple column scan at a single read station of a sorter.
Figure 13:
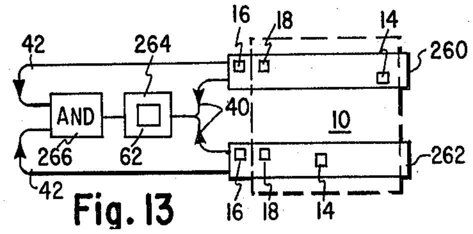

FIGURES 12 and 13 illustrate how sorting on more than one card column can be simultaneously conducted with the object of deflecting the card for the cases when either desired information is found in at least one of the scanned columns (logical OR), or when desired information is found in all of the scanned (logical AND). In FIGURE 12, there are two reading heads 260 and 262 at a read station each of the nature disclosed in FIGURE 1, except that neither includes amplifier 48. These heads scan two different columns of the card for the same or different values. However, only one deflecting head 264 need be used which contains the fluid amplifier 48 and port 62 through which power stream fluid may be forced in order to deflect the card into the hopper associated with the read station. Each output conduit 42 of the heads 260 and 262 may be connected to control stream input channel so that if either head identifies information in its respective column, the single fluid amplifier 48 is switched to deflect the card. The other channel 40 from each head is connected to input channel 44 of the fluid amplifier in order to ensure the initial reset of said amplifier 48 prior to the instant of scan. FIGURE 12 therefore shows a logical OR configuration. An alternative embodiment of FIGURE 12 is one where each head 260 and 262 contains a deflecting fluid amplifier 48.

FIGURE 13 differs from FIGURE 12 in that each of the multiple columns being scanned must contain identifiable information before card deflection occurs. This logical AND function may be performed by having a single fluid amplifier deflecting head 264 whose control channel 46 is connected to the output of an AND logical element 266 whose inputs in turn are connected to the output channel 42 from each read head. In order to obtain an output from AND element 266 which places the fluid amplifier in its deflecting condition, there must be simultaneous signals on channels 42 from both of the heads 260 and 262. If either head 260 or 262 fails to identify column information for which it is designed, the single fluid amplifier 48 will not have its power stream deflected to opening 62. The other output conduit 40 from each head may be connected to channel 44 of the fluid amplifier in order to insure that it is in its exhaust state prior to reading. Obviously, more than two columns may be scanned by the technique shown in FIGURE 13 through the use of additional AND logic elements.

While the invention has been shown as being particularly adapted for sorting punched record cards, its use is not to be restricted to such an environment. For certain jobs there may be required only identification without sorting, such that fluid amplifier 48 need not be connected to a sort station. In this connection it is obvious that endless perforated tape may be read by the fluid identification logic if additional perforations (or voids) are provided therein to effectively define leading and trailing edges between which the information perforations are located. However, it is emphasized that the sorter combinations disclosed herein are considered to be highly novel since they also use an element of the fluid identification logic, i.e., amplifier 48, as the card deflecting means. Furthermore, it is apparent that stages of amplification may be inserted between logic elements without departing from the scope of this invention. Other logical arrangements might also be devised without exercise of invention using the same number and spacing of read station openings. Therefore, many modifications can be made by those skilled in the art without departing from the spirit of the invention as defined in the appended claims.

The embodiments of the invention in which an exclusive property or privilege is claimed are defined as follows:

1. Fluid apparatus for determining the presence or absence of a perforation in at least a first specified position on sheet material moving in a particular direction therethrough where said specified position lies between leading and trailing sheet material edges as defined by voids in said sheet material which are spaced apart in said direction of motion, said apparatus comprising:

(a) a sheet material read station which has both edge detecting and perforation sensing fluid openings each adjacent the path of said sheet material and all spaced apart from one another in the direction of its motion so as to be selectively blocked thereby, such that a particular predetermined combination of blocked and unblocked fluid openings only occurs when a perforation is present in said first specified position;

(b) fluid source means for producing fluid flow through all unblocked read station fluid openings; and (c) fluid logic means connected with all of said read station fluid openings and responsive to the states of fluid flow therethrough for generating a fluid output indicative of the presence or absence of said particular predetermined combination of blocked and unblocked openings.

2. Fluid apparatus according to claim 1 wherein said read station includes one perforation sensing opening and first and second edge detecting openings, said openings being spaced apart from one another such that when said one perforation sensing opening is aligned with said first specified position, said first edge detecting opening is immediately ahead of said leading edge so as to be unblocked, and said second edge detecting opening is immediately beyond said leading edge so as to be blocked.

3. Fluid apparatus according to claim 1 for determining the presence or absence also of a perforation in a second specified position on the sheet material lying between said leading and trailing edges, wherein said read station includes first and second perforation sensing openings and first and second edge detecting openings, said openings being spaced apart from one another such that when said first and second perforation sensing openings are simultaneously aligned with said first and second specified positions, respectively, said first edge detecting opening is immediately ahead of said leading edge so as to be unblocked, and said second edge detecting opening is immediately behind said leading edge so as to be blocked.

4. Fluid apparatus according to claim 1 wherein said read station includes one perforation sensing opening first and second edge detecting openings, said openings being spaced apart from one another such that when said one perforation sensing opening is aligned with said first specified position, said first edge detecting opening is immediately behind said leading edge so as to be blocked, and said second edge detecting opening is immediately ahead of said trailing edge so as to be blocked.

5. Fluid apparatus according to claim 4 wherein said read station further includes an additional fluid opening connected to said fluid logic means for establishing an initial operating condition thereof which is spaced apart from said other read station openings such that when said one perforation sensing opening is aligned with said first specified position, said additional opening is behind said trailing edge so as to be unblocked.

6. Fluid apparatus according to claim 1 wherein said read station includes one perforation sensing opening and one edge detecting opening, said openings being spaced apart from one another such that when said one perforation sensing opening is aligned with said first specified position, said one edge detecting opening is immediately ahead of said trailing edge so as to be blocked.

7. Fluid apparatus according to claim 1 for determining the presence or absence also of a perforation in a second specified position on sheet material lying between said leading and trailing edges, wherein said read station includes first, second, and third perforation sensing openings and first and second edge detecting openings, said openings being spaced apart from one another such that when said first perforation sensing opening is aligned with said first specified position, said second perforation sensing opening is approximately a one-perforation diameter distance away from alignment with second specified position in the direction of motion, said third perforation sensing opening is approximately a two-perforation diameter distance away from alignment with said first specified position in the direction of motion, said first edge detecting opening is immediately behind said leading edge so as to be blocked, and said second edge detecting opening is approximately a three-perforation distance ahead of said trailing edge so as to be blocked.

8. Fluid apparatus according to claim 7 wherein said read station further includes an additional opening connected to said fluid logic means for establishing an initial operating condition thereof which is spaced apart from said other read station openings such that when said first perforation sensing opening is aligned with said first specified position, said additional opening is behind said trailing edge so as to be unblocked.

9. Fluid apparatus according to claim 1 wherein said read station has a plurality of perforation sensing fluid openings spaced apart from one another in the direction of motion, and further includes means for selectively blocking fluid flow through certain ones of said perforation sensing openings in order to selectively determine the presence or absence of perforations in different specified positions on said sheet material.

10. Fluid apparatus according to claim 9 wherein said blocking means is comprised of selectively perforated sheet material.

11. Fluid apparatus according to claim 9 wherein said blocking means includes at least one movable member having a port therethrough which can be selectively aligned with any one of a number of said perforation sensing openings.

12. Fluid apparatus according to claim 1 wherein said fluid source means is connected between said openings and said fluid logic means.

13. Fluid apparatus according to claim 1 wherein said fluid source means is located in the opposite side of said sheet material from said openings.

14. Fluid apparatus for determining the presence or absence of a perforation in at least a first specified position on sheet material moving in a particular direction therethrough, where said specified position lies between leading and trailing sheet material edges as defined by voids in said sheet material which are spaced apart in said direction of motion, said apparatus comprising:

(a) a sheet material read station which includes at least one perforation sensing opening and first and second edge detecting openings, each adjacent to the path of said sheet material, being spaced apart from one another in the direction of motion such that when said one perforation sensing opening is aligned with said first specfied position said first edge detecting opening is immediately ahead of said leading edge so as to be unblocked, and said second edge detecting opening is immediately behind said leading edge so as to be blocked;

(b) a bistable pure fluid amplifier with first and second input control channels for respectively directing power stream fluid through first or second power stream output channels;

(c) multi-input fluid logical AND means having an output connected to said first input control channel;

(d) fluid conveying means respectively connecting said first edge detecting opening and said one perforation sensing opening with different inputs of said AND means, and also connecting said second edge detecting openings with said second input control channel; and (e) fluid source means for producing fluid flow through all unblocked read station fluid openings.

15. Fluid apparatus according to claim 14 wherein said fluid conveying means includes fluid inverter elements in each of said connections, and said fluid source means is connected with said fluid conveying means between said fluid openings and said inverters.

16. Fluid apparatus according to claim 14 wherein is further included a sort station for receiving said sheet material in the forms of a record card when it leaves said read station, said sort station having at least two record card output paths and at least one fluid opening for applying fluid pressure to one side of said record card in order to direct it to one of said output paths, and means connecting one of said power stream output channels to said sort station fluid opening.

17. Fluid apparatus for determining the presence or absence of a perforation in both first and second specified positions on sheet material moving in a particular direction therethrough, where said specified positions lie between leading and trailing sheet material edges as defined by voids in said sheet material which are spaced apart in said direction of motion, said apparatus comprising:

(a) a sheet material read station which includes first and second perforation sensing openings and first and second edge detecting openings, each adjacent the path of said sheet material, said openings being spaced apart from one another in the direction of motion such that when said first and second perforation sensing openings are simultaneously aligned with said first and second specified positions, respectively, said first edge detecting opening is immediately ahead of said leading edge so as to be unblocked, and said second edge detecting opening is immediately behind said leading edge so as to be blocked;

(b) a bistable pure fluid amplifier with first and second input control channels for respectively directing power stream fluid through first and second power stream output channels;

(c) first multi-input fluid logical AND means having an output connected to said first input control channel, and second multi-input fluid logical AND means having an output connected to one input of said first AND means;

(d) fluid conveying means respectively connecting said first edge detecting opening and said first perforation sensing opening with different inputs of said second AND means, connecting said second perforation sensing opening with another of said first AND means, and connecting said second edge detecting opening with said second input control channel, and (e) fluid source means for producing fluid flow through all unblocked read station fluid openings.

18. Fluid apparatus according to claim 17 wherein said fluid conveying means includes fluid inverter elements in each of said connections, and said fluid source means is connected with said fluid conveying means between said fluid openings and said inverters.

19. Fluid apparatus according to claim 17 wherein is further included a sort station for receiving said sheet material in the forms of a record card when it leaves said read station, said sort station having at least two record card output paths and at least one fluid opening for applying fluid pressure to one side of said record card in order to direct it to one of said output paths, and means connecting one of said power stream output channels to said sort station fluid opening.

20. Fluid apparatus for determining the presence or absence of a perforation in at least a first specified position on sheet material moving in a particular direction therethrough, where said specified position lies between leading and trailing sheet material edges as defined by voids in said sheet material which are spaced apart in said direction of motion, said apparatus comprising:

(a) a sheet material read station which includes one perforation sensing opening and first and second edge detecting openings, each adjacent the path of said sheet material, said openings being spaced apart from one another in the direction of motion such that when said one perforation sensing opening is aligned with said first specified position, said first edge detecting opening is immediately behind said leading edge so as to be blocked, and said second edge detecting opening is immediately ahead of said trailing ege so as to be blocked;

(b) a bistable pure fluid amplifier with first and second input control channels for respectively directing power stream fluid through first or second power stream output channels;

(c) fluid operating means connected to said first input control channel for establishing an initial condition of power stream flow through said pure fluid amplifier;

(d) multi-input fluid logical AND means having an output connected with said second input control channel;

(e) fluid conveying means respectively connecting said one perforation opening and said first and second edge detecting openings to different inputs of said AND means; and (f) fluid source means for producing fluid flow through all unblocked read station fluid openings.

21. Fluid apparatus according to claim 20 wherein said fluid logical AND means is comprised of a single fluid channel inter-connecting all of said aforementioned read station openings, and said fluid source means is connected to said fluid channel between said openings and said second input control channel.

22. Fluid apparatus according to claim 20 wherein is further included a sort station for receiving said sheet material in the form of a record card when it leaves said read station, said sort station having at least two record card output paths and at least one fluid opening for applying fluid pressure to one side of said record card in order to direct it to one of said output paths, and means connecting one of said power stream output channels to said sort station fluid opening.

23. Fluid apparatus according to claim 20 wherein said fluid operating means is comprised of an additional fluid opening at said read station connected to said first input control channel and which is spaced apart from said other read station openings in the direction of motion such that when said first perforation sensing opening is aligned with said first specified position, said additional opening is behind said trailing edge so as to be unblocked.

24. Fluid apparatus for determining the presence or absence of a perforation in at least a first specified position on sheet material moving in a particular direction therethrough, where said specified position lies between leading and trailing sheet material edges as defined by voids in said sheet material which are spaced apart in said direction of motion, said apparatus comprising:

(a) a sheet material read station which includes one perforation sensing opening and one edge detecting opening each adjacent the path of said sheet material, said openings being spaced apart from one another in the direction of motion such that when said one perforation sensing opening is aligned with said first specified position, said one edge detecting opening is immediately ahead of said trailing edge so as to be blocked;

(b) a bistable pure fluid amplifier with first and second input control channels for respectively directing power stream fluid through first or second power stream output channels;

(c) fluid logical means having X and Y fluid signal inputs and A and B fluid signal outputs, with a logical function of $A=X\cdot\overline{Y}$ and $B=X\cdot Y$, where $(\cdot)$ represents logical AND and $(^{-})$ represents logical NOT;

(d) first fluid conveying means connecting said A and B outputs to said first and second input control channels, respectively, and second fluid conveying means connecting said perforation sensing openings and said edge detecting opening to said Y and X inputs, respectively; and (e) fluid source means for producing fluid flow through all unblocked read station fluid openings.

25. Fluid apparatus according to claim 24 wherein said fluid source means is connected with said second fluid conveying means between said openings and said X and Y inputs.

26. Fluid apparatus according to claim 24 wherein is further included a sort station for receiving said sheet material in the form of a record card when it leaves said read station, said sort station having at least two record card output paths and at least one fluid opening for applying fluid pressure to one side of said record card in order to direct it to one of said output paths, and means connecting one of said power stream output channels to said sort station fluid opening.

27. Fluid apparatus for determining the presence or absence of perforations both first and second specified positions on sheet material moving in a particular direction therethrough, where said specified positions lie between leading and trailing sheet material edges as defined by voids in said sheet material which are spaced apart in said direction of motion, said apparatus comprising:

(a) a sheet material read station which includes first, second and third perforation sensing openings and first and second edge detecting openings each adjacent the path of said sheet material, said openings being spaced apart from one another in the direction of motion such that when said first perforation sensing opening is aligned with said first specified position, said second perforation sensing opening is approximately a one-perforation diameter distance away from alignment with said second specified position in the direction of motion, said third perforation sensing opening is approximately a two-perforation diameter distance away from alignment with said first specified position in the direction of motion, said first edge detecting opening is immediately behind said leading edge so as to be blocked, and said second edge detecting opening is approximately a three perforation distance ahead of said trailing edge so as to be blocked;

(b) a bistable pure fluid amplifier with first and second input control channels for respectively directing power stream flow through first or second power stream output channels;

(c) fluid operating means connected to said first input control channel for establishing an initial condition of power stream flow through said fluid amplifier;

(d) a multi-input fluid logical AND means having an output connected with said second input control channel; and each of its inputs connected to a different one of said fluid openings;

(e) fluid conveying means respectively connecting said first, second, and third perforation sensing openings and said first and second edge detecting openings to different inputs of said AND means; and (f) fluid source means for producing fluid flow through all unblocked read station fluid openings.

28. Fluid apparatus according to claim 27 wherein said fluid logical AND means is comprised of a single fluid channel inter-connecting all of said aforementioned read station openings, and said fluid source means is connected to said fluid channel between said openings and said second input control channel.

29. Fluid apparatus according to claim 27 wherein is further included a sort station for receiving said sheet material in the form of a record card when it leaves said read station, said sort station having at least two record card output paths and at least one fluid opening for applying fluid pressure to one side of said record card in order to direct it to one of said output paths, and means connecting one of said power stream output channels to said sort station fluid opening.

30. Fluid apparatus according to claim 27 wherein said fluid operating means comprised of an additional fluid opening at said read station connected to said first input control channel and which is spaced apart from said other read station openings in the direction of motion such that when said first perforation sensing opening is aligned with said first specified position, said additional opening is behind said trailing edge so as to be unblocked.

31. A fluid sorter for determining the path of a record card moving therethrough in accordance with the presence or absence of a perforation in at least a first specified position of at least one selected column thereon, where said first specified position lies between leading and trailing edges of said record card, said sorter comprising:

(a) a sheet material read station which has both edge detecting and perforation sensing fluid openings each adjacent the path of said sheet material and all spaced apart from one another in the direction of its motion so as to be selectively blocked thereby, such that a particular predetermined combination of blocked and unblocked fluid openings only occurs when a perforation is present in said first specified position;

(b) fluid source means for producing fluid flow through all unblocked read station fluid openings;

(c) fluid logic means connected with all of said read station fluid openings and responsive to the states of fluid flow therethrough for generating a fluid output indicative of the presence or absence of said particular predetermined combination of blocked and unblocked openings;

(d) a sort station for receiving said record card when it leaves said read station and having at least two card output paths which further include at least one fluid opening for applying fluid pressure to one side of said record card in order to direct it to one of said output paths; and (e) means conveying the fluid output from said fluid logic means to said sort station fluid opening.

32. A fluid sorter according to claim 31 wherein said fluid logic means can be selectively adjusted to generate a fluid output only when particular combination is present, or alternatively, to generate a fluid output only when said particular combination is absent.

33. A fluid sorter according to claim 31 wherein said fluid logic means includes a bistable pure fluid amplifier with first and second power stream output channels, and said conveying means comprises a fluid channel connecting one of said power stream output channels and said sort station fluid opening.

34. A fluid sorter according to claim 33 wherein said conveying means is adjustable to selectively connect either one of said power stream channels to said sort station fluid opening.

35. A fluid sorter according to claim 33 wherein is further included at said sort station a second fluid opening for applying fluid pressure to the opposite side of said card in order to direct it to the other of said output paths, and said conveying means includes another fluid channel connecting the other of said power stream output channels and said sort station second fluid opening.

36. A fluid sorter according to claim 31 for determining the path of a record card in accordance with the presence or absence of a perforation in at least one specified position in each of a plurality of selected columns thereon, wherein said read station includes at least one perforation sensing opening for each selected card column.

37. A fluid sorter according to claim 36 wherein said fluid logic means includes OR logic for generating a fluid output whenever a particular predetermined combination of blocked and unblocked edge detecting and perforation sensing openings is created for any one of said selected card columns.

38. A fluid sorter according to claim 36 wherein said fluid logic means includes AND logic for generating fluid output only when a particular predetermined combination of blocked and unblocked edge detecting and perforation sensing openings is created for each of said selected card columns.

References Cited by the Examiner

UNITED STATES PATENTS 3,169,639 2/1965 Bauer ---------------- 209—110

M. HENSON WOOD, JR., *Primary Examiner.*

J. N. ERLICH, *Assistant Examiner.*